United States Patent Office.
JACOB W. ARNOLD, OF JEFFERSON TOWNSHIP, (DAYTON P. O.,) MONTGOMERY COUNTY, OHIO.
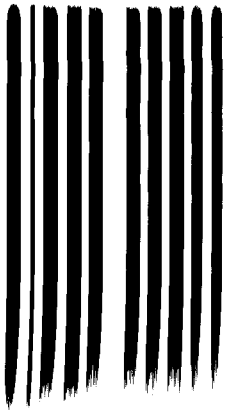

(No Model.)
J. W. ARNOLD.
CIDER PRESS.
No. 244,516. Patented July 19, 1881.
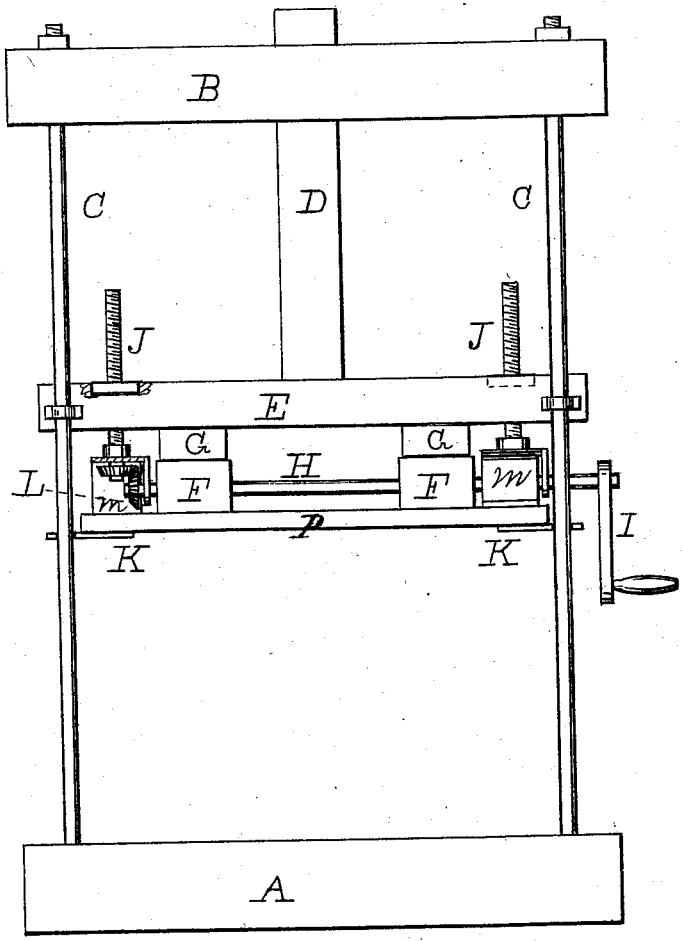
WITNESSES:
John Trautmann
L. Leibold
INVENTOR
Jacob W. Arnold
BY B. Pickering
ATTORNEY